Dec. 2, 1941.  G. F. BEHRINGER  2,264,502
VARIABLE ELECTRICAL CONDENSER AND METHOD OF MAKING SAME
Filed Sept. 26, 1940
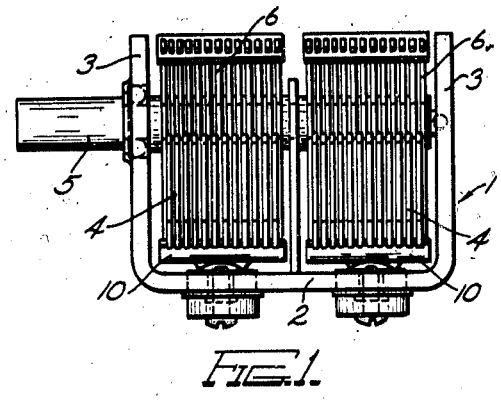
FIG. 1.
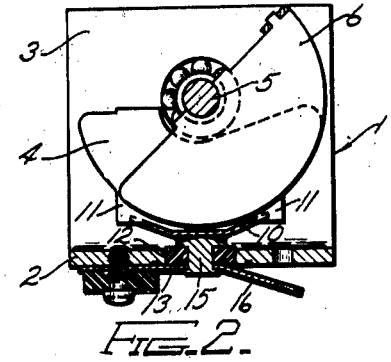
FIG. 2.
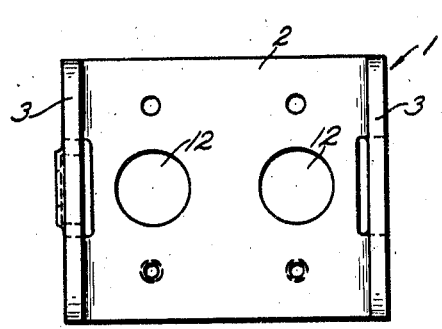
FIG. 3.
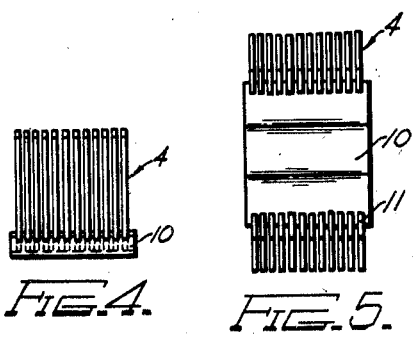
FIG. 4.   FIG. 5.
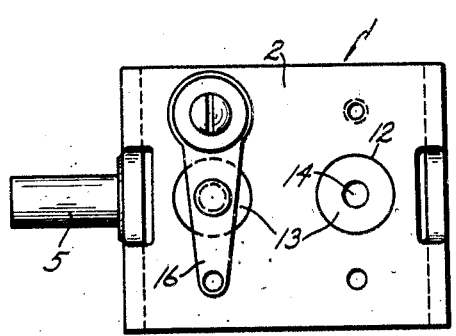
FIG. 8.
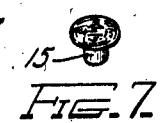
FIG. 6.
FIG. 7.
Inventor
GROVER F. BEHRINGER
By Owen & Owen
Attorneys.

Patented Dec. 2, 1941

2,264,502

UNITED STATES PATENT OFFICE 2,264,502

VARIABLE ELECTRICAL CONDENSER AND METHOD OF MAKING SAME

Grover F. Behringer, Defiance, Ohio, assignor to The American Steel Package Company, Defiance, Ohio, a corporation of Ohio Application September 26, 1940, Serial No. 358,515

9 Claims. (Cl. 175—41.5)

This invention relates to electrical condensers of the variable type, and particularly to those of the character commonly employed in radio receiving and transmitting sets and in which one or more interleafing sets of stator and rotor plates are employed.

In condensers of this type, it is necessary to mount each set of stator plates in rigid relation to the supporting frame and in a strong and durable manner to prevent any movement of the set relative to the frame, so that the proper spaced interleafing adjustment of such plates relative to the cooperating rotor plates may be maintained during use and during rough handling, as well understood in the art. In order to secure the necessary rigid and strong mounting of the stator plate sets, it has been the practice and considered necessary, so far as I am aware, to provide the frame with a multiple support mounting means for each stator set.

The primary objects of the invention are to simplify the construction, lessen the cost of manufacture, and improve the electrical characteristics of condensers of this type.

A further object of the invention is the provision of a single support or mount for each stator plate set of a variable electrical condenser which is of a strong and rigid nature and which makes it possible to materially reduce the size of condensers of this character within commercial production limits and without prohibitive costs.

Other objects and advantages of the invention will be apparent from the following detailed description and from the accompanying drawing illustrating one embodiment of the invention, in which—

Figure 1 is an enlarged side view of a variable electrical condenser embodying the invention, with the rotor turned up slightly from fully interleaved position; Fig. 2 is a cross-section thereof on the line 2—2 in Fig. 1; Fig. 3 is a top plan view of the frame alone; Figs. 4 and 5 are side and bottom views, respectively, of a stator plate set before attaching to the frame; Fig. 6 is a perspective view of the dielectric member of the stator mounting means; Fig. 7 is a similar view of the rivet member of such means, and Fig. 8 is a bottom plan view of the condenser, with mounting means and associated terminal lug for one stator plate set complete and with the other only partially completed.

Referring to the drawing, 1 designates the condenser frame, in the present instance of U-shape, and having the bottom 2 and opposing ends 3, 3; 4, 4 separate sets of stator plates fixedly attached to the frame; 5 a rotor shaft journaled in suitable bearings in the frame ends 3, and 6, 6 separate sets of rotor plates fixedly attached to the shaft and having rotatable interleafing adjustment with the respective stator plate sets, as well understood in the art.

The mounting feature for each stator plate set, in which the present invention resides, includes a base plate 10 secured to and rigidly connected to the stator plates 4 in spaced parallel relation. In the present instance, this base plate is notched at its ends to straddle or receive spurs 11 provided on the lower edge portions of the stator plates in spaced relation lengthwise thereof. These spurs may have a pressed fit in the base plate notches or be firmly held therein by swaging, or in any other suitable manner.

The frame bottom 2 is provided substantially centrally beneath each stator plate set 4 with an opening 12 preferably of circular form, and in this opening is firmly and rigidly mounted a dielectric member 13 of flat ring-form. This member is preferably composed of ceramic material. In the opening 14 of the dielectric member 13 is firmly and rigidly mounted a rivet 15 with one end preferably projecting below the bottom of the member 13 to facilitate attaching a terminal lug or combined terminal lug and trimmer condenser spring strip 16 to the rivet at the under side of the frame. The upper end of the rivet 15 is rigidly attached to the base plate 10 preferably centrally thereof by soldering, or in any other suitable manner, and with the base plate 10 slightly spaced above the bottom of the frame.

The method employed in mounting a stator plate set in a frame in accordance with the invention comprises first positioning a dielectric member 13 in a frame opening 12 and rigidly securing it in the opening by swaging or compressing the metal entirely around the member, so that the frame metal forming the wall of the opening 12 will flow into intimate engagement with the peripheral wall of the dielectric member so as to rigidly and securely attach the dielectric member to the frame. It is found in practice that a ceramic member 13 will in this manner stand a very high radial compression without crumbling or fracturing. The dielectric member 13 having been secured in the frame opening, the rivet 15 is inserted into the opening of such member and firmly and rigidly secured therein by application of a compressing force to the rivet lengthwise thereof, so as to expand the metal of the rivet into intimate, firm and rigid contact with the member 13. It is preferable to secure the rivet in the dielectric member 13 after securing of the latter in the frame opening as the confining action of the frame opening wall prevents fracturing of the member 13 during expansion of the rivet therein.

The next step in the operation consists in assembling the rotor and stator units in the frame with the stator floating, and then, by means of a jig, properly aligning the stator with the fixed rotor unit. This having been done, the stator unit 4 is rigidly secured to the frame in adjusted relation to the rotor unit by soldering or otherwise suitably attaching the inner or upper end of the rivet 15 to the base plate 10 of the stator unit substantially centrally thereof. If desired, a terminal lug 16 or combined lug and trimmer condenser spring plate may be attached to the outer end of the rivet at the same time the rivet or metal insert is expanded in the hole in part 13. The member 16 in practice is insulated from the frame by a thin mica strip (not shown).

It is found in practice that this form of single support mount for a stator unit and method of assembly of the parts thereof provide a very simple and rigid form of mounting and in addition lessens the number of parts and simplifies the construction mechanically and improves the electrical characteristics of variable electrical condensers of the character described, as well as making it possible to materially reduce the size of such condensers within commercial production limits and without prohibitive costs.

It will be noted that the single mounting for the stator cuts the distributed capacity of the condenser to a minimum since there are no widely separated fastening elements between which stray fields can be set up. This result flowing from the manner of mounting the stator is highly important particularly in the manufacture of small condensers for high frequency operation.

I wish it understood that my invention is not limited to any specific construction, arrangement or form of the parts, as it is capable of numerous modifications and changes without departing from the spirit of the claims.

Having thus described my invention, what I claim as new and desire to secure by United States Letters Patent is:

1. In a variable electrical condenser of the type including a frame and cooperating stator and rotor units, a mount for the stator unit comprising the provision in the frame of an opening, a dielectric member fixedly mounted in said opening and having an opening therein, a metal insert rigidly secured in said member opening and projecting therefrom and being rigidly connected to the base of said stator unit substantially centrally thereof and constituting a single support for the unit.

2. In a variable electrical condenser of the type including a frame and cooperating stator and rotor units, a mount for the stator unit comprising the provision in the frame of an opening, a ceramic member fixedly mounted in said opening and having an opening therein, a metal insert expanded in said last named opening and projecting therefrom and being rigidly connected to the base of said stator unit substantially centrally thereof and constituting a single support for the unit.

3. In a variable electrical condenser of the type including a frame and cooperating stator and rotor units, a mount for the stator unit comprising the provision of an opening in the frame bottom, a dielectric member fixedly mounted in said opening with its periphery in intimate, rigid coaction with the wall of the opening and having a substantially centrally disposed opening therein, a metal insert rigidly secured in said member opening in intimate rigid coaction with the wall of the opening and having its inner end projecting from said member and in rigid connection with the base of said stator unit substantially centrally thereof and constituting a single support for the unit.

4. In a variable electrical condenser of the type including a frame with bottom and end plates and cooperating stator and rotor units, the latter being rotatably carried by the frame ends, a mount for the stator unit comprising the provision of a substantially circular opening in the frame bottom, a ceramic member of ring-form fixedly mounted in said opening with its periphery in rigid intimate coaction with the wall of the opening and a metal insert disposed in the center of said ceramic member in rigid intimate coaction with its inner wall and projecting at its inner and outer ends from said member, the inner end of the insert being fixedly attached to the bottom of the stator plate unit substantially centrally thereof and constituting a single support for the unit.

5. In a variable electrical condenser of the type including a frame and cooperating stator and rotor units, a mount for the stator unit comprising the provision of an opening in the frame at the bottom of the stator unit, a base plate fixed to and connecting the lower edges of the stator unit plates, a dielectric member of ring-form fixedly mounted in said frame opening with its peripheral wall in intimate rigid coaction with the opening wall, a metal insert secured in and rigidly and intimately fitting the opening of said dielectric member and having its inner end rigidly connected to said base plate.

6. The method of mounting a stator unit in the frame of a variable electrical condenser, which includes providing an opening in the frame bottom substantially centrally beneath the mounting position of the stator unit, inserting a dielectric member in said opening and compressing the opening wall to firmly and rigidly grip the member, said member having an opening therethrough with one end adjacent to the stator unit mounting position, positioning a metal insert in said member opening and applying pressure lengthwise to the insert to expand it in said member to effect a rigid holding of the insert by the member, properly positioning the stator unit in the frame over said member and insert and relative to the associated rotor unit and then fixedly attaching the base of the unit to the inner end of the insert to provide a single support for the unit in the frame.

7. The method of mounting a stator unit in the frame of a variable electrical condenser, which includes providing a substantially round opening in the frame bottom substantially centrally beneath the mounting position of the unit, inserting a ring-form dielectric member in said opening and applying pressure marginally to the opening wall substantially uniformly therearound to compress the wall around the member periphery to rigidly and intimately embrace it, positioning a metal insert in the opening of said member with at least its inner end projected beyond the inner side of the member, expanding the insert within the member to rigidly and intimately engage its opening wall, and then properly positioning the stator unit in the frame with respect to the associated rotor unit and soldering the adjacent end of the insert substantially centrally to the base of the stator unit to provide a single support therefor in the frame.

8. The method of mounting a stator unit in the frame of a variable electrical condenser, said unit having a base plate connecting and carrying the insulatingly spaced plates thereof, which method includes providing a substantially round opening in the frame bottom substantially centrally beneath the mounting position of the unit, positioning a ring-form ceramic dielectric member in said opening and applying pressure marginally to the opening wall substantially uniformly therearound to compress the wall around the member periphery to rigidly and intimately embrace it, positioning a metal insert in the opening of said member with at least its inner end projected beyond the inner side of the member, expanding the insert within the member to rigidly and intimately engage its opening wall, and then properly positioning a stator unit in the frame with respect to the associated rotor unit and soldering the adjacent end of the insert substantially centrally to the base plate of the stator unit to provide a single support in the frame for the unit.

9. The method of assembling the fixedly mounted parts of a variable electrical condenser in a frame, which includes providing an opening in the frame bottom substantially centrally beneath the mounting position of the stator unit, inserting a dielectric member in said opening and applying pressure marginally to the opening wall to compress the wall around the member periphery to rigidly and intimately embrace it, said member having an opening therein, positioning a metal insert in the opening of said member with its ends projecting therefrom respectively inwardly and outwardly of the frame, expanding the insert within the member to rigidly and intimately engage its opening wall, properly positioning the stator unit in the frame with respect to the associated rotor unit and soldering the adjacent end of the insert substantially centrally to the base of the stator unit to provide a single support for the stator unit in the frame, and fixedly attaching the outer end of said insert to a terminal lug or combined lug and trimmer condenser spring plate.

GROVER F. BEHRINGER.